(12) United States Patent
Banks et al.

(10) Patent No.: US 11,473,433 B2
(45) Date of Patent: Oct. 18, 2022

(54) AIRFOIL WITH TRAILING EDGE ROUNDING

(71) Applicant: United Technologies Corporation, Farmington, CT (US)

(72) Inventors: Anton G. Banks, Manchester, CT (US); Alan C. Barron, Jupiter, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 431 days.

(21) Appl. No.: 16/043,257

(22) Filed: Jul. 24, 2018

(65) Prior Publication Data

US 2020/0032657 A1 Jan. 30, 2020

(51) Int. Cl.
*F01D 5/28* (2006.01)
*F01D 5/14* (2006.01)
*F01D 5/18* (2006.01)

(52) U.S. Cl.
CPC ............ *F01D 5/288* (2013.01); *F01D 5/143* (2013.01); *F01D 5/186* (2013.01); *F01D 5/189* (2013.01); *F01D 5/147* (2013.01); *F05D 2220/323* (2013.01)

(58) Field of Classification Search
CPC .......... F01D 5/141; F01D 5/147; F01D 5/186; F01D 5/187; F01D 5/189; F01D 5/288; F05D 2240/122; F05D 2240/304
See application file for complete search history.

(56) References Cited

U.S. PATENT DOCUMENTS

| | | | |
|---|---|---|---|
| 6,490,791 B1 * | 12/2002 | Surace | B23P 6/007 29/402.06 |
| 6,616,406 B2 * | 9/2003 | Liang | F01D 5/186 416/97 R |
| 7,491,033 B2 * | 2/2009 | Trishkin | F01D 5/18 29/889.721 |
| 8,070,454 B1 | 12/2011 | Rawlings | |
| 8,506,256 B1 * | 8/2013 | Brostmeyer | F01D 5/18 416/223 A |
| 9,267,383 B2 | 2/2016 | Batt et al. | |
| 9,416,669 B2 | 8/2016 | Batt et al. | |
| 2006/0260125 A1 * | 11/2006 | Arnold | B23P 6/007 29/889.1 |

(Continued)

FOREIGN PATENT DOCUMENTS

WO WO-2018031032 A1 * 2/2018 ............. F01D 5/147

OTHER PUBLICATIONS

European Search Report Issued In EP Application No. 19188207.5; dated Dec. 18, 2019; 7 Pages.

(Continued)

*Primary Examiner* — Christopher R Legendre
(74) *Attorney, Agent, or Firm* — Cantor Colburn LLP

(57) ABSTRACT

An airfoil for a gas turbine engine includes a substrate portion extending from an airfoil leading edge to an airfoil trailing edge portion. The airfoil trailing edge portion includes a flared portion wherein a substrate portion thickness increases along a camber line of the airfoil, and a trailing edge defined as a full constant radius extending from a pressure side of the airfoil to a suction side of the airfoil. A coating portion includes a coating applied over at least a portion of the substrate portion.

12 Claims, 3 Drawing Sheets

(56) References Cited

U.S. PATENT DOCUMENTS

| | | | |
|---|---|---|---|
| 2015/0034604 A1* | 2/2015 | Subramanian | F01D 5/288 |
| | | | 219/73.21 |
| 2015/0369060 A1 | 12/2015 | Levine | |
| 2017/0204729 A1* | 7/2017 | Mozharov | F01D 5/18 |
| 2017/0328216 A1 | 11/2017 | Gallier | |
| 2020/0032657 A1* | 1/2020 | Banks | F01D 5/187 |

OTHER PUBLICATIONS

European Office Action Issued in EP Application No. 19188207.5; dated Jan. 12, 2021; 3 pages.

* cited by examiner

AIRFOIL WITH TRAILING EDGE ROUNDING

BACKGROUND

Exemplary embodiments of the present disclosure pertain to the art of airfoils for gas turbine engines.

Gas turbine engine airfoils, such as turbine stator airfoils are often formed via a casting process, with a coating, such as a thermal barrier coating (TBC) applied to the airfoil. In the design of the airfoil, the aerodynamic shape is determined by the as-coated surface. When configuring the cast configuration for manufacture, the nominal coating thickness is subtracted from the as-coated design surface.

During actual manufacture, however, the trailing edge is typically left uncoated, and as a result the trailing edge is thinner than the design intent. Further, the trailing edge, which is already thin, is made thinner by the removal of the coating thickness. Further, there is a trend to produce turbine airfoils with a fully rounded trailing edge for improved turbine efficiency. Because of the above-described thinning of the trailing edge, there may be insufficient thickness remaining to effectively machine a full radius at the trailing edge, and also will leave a large step between the coated airfoil surface and the uncoated trailing edge surface. This combination greatly reduces turbine efficiency.

BRIEF DESCRIPTION

In one embodiment, an airfoil for a gas turbine engine includes a substrate portion extending from an airfoil leading edge to an airfoil trailing edge portion. The airfoil trailing edge portion includes a flared portion wherein a substrate portion thickness increases along a camber line of the airfoil, and a trailing edge defined as a full constant radius extending from a pressure side of the airfoil to a suction side of the airfoil. A coating portion includes a coating applied over at least a portion of the substrate portion.

Additionally or alternatively, in this or other embodiments the coating layer includes a body portion having a substantially constant coating thickness, and a taper portion located between the body portion and the trailing edge.

Additionally or alternatively, in this or other embodiments the taper portion extends to a coating edge located upstream of the trailing edge.

Additionally or alternatively, in this or other embodiments the trailing edge is free from coating.

Additionally or alternatively, in this or other embodiments the substrate portion is formed by casting.

Additionally or alternatively, in this or other embodiments the trailing edge is formed by one or more machining processes.

Additionally or alternatively, in this or other embodiments the coating is a thermal barrier coating.

Additionally or alternatively, in this or other embodiments a core center discharge is located at the trailing edge to exhaust a cooling airflow from an interior of the airfoil.

In another embodiment, a substrate of an airfoil for a gas turbine engine includes a substrate body, an airfoil leading edge located at a first end of the substrate body, and an airfoil trailing edge portion located at a second end of the substrate body opposite the first end. The airfoil trailing edge portion includes a flared portion wherein a substrate portion thickness increases along a camber line of the airfoil, and a trailing edge defined as a selected shape extending from a pressure side of the airfoil to a suction side of the airfoil.

Additionally or alternatively, in this or other embodiments the selected shape is a full constant radius extending from the pressure side to the suction side.

Additionally or alternatively, in this or other embodiments the substrate portion is formed by casting.

Additionally or alternatively, in this or other embodiments the trailing edge is formed by one or more machining processes.

Additionally or alternatively, in this or other embodiments a core center discharge is located at the trailing edge to exhaust a cooling airflow from an interior of the airfoil.

In yet another embodiment, a method of forming an airfoil for a gas turbine engine includes forming an airfoil substrate portion. The airfoil substrate portion includes an excess material portion at a trailing edge of the airfoil substrate portion. The excess material portion is machined to define a flared portion wherein a substrate portion thickness increases along a camber line of the airfoil, and a trailing edge defined as a selected shape extending from a pressure side of the airfoil to a suction side of the airfoil.

Additionally or alternatively, in this or other embodiments machining the excess material portion to define the selected shape includes forming a full constant radius extending from the pressure side to the suction side.

Additionally or alternatively, in this or other embodiments a coating portion is applied as a coating over at least a portion of the substrate portion.

Additionally or alternatively, in this or other embodiments applying the coating portion includes applying a body portion having a substantially constant coating thickness and applying a taper portion disposed between the body portion and the trailing edge.

Additionally or alternatively, in this or other embodiments the taper portion extends to a coating edge located upstream of the trailing edge.

Additionally or alternatively, in this or other embodiments the trailing edge is free from coating.

Additionally or alternatively, in this or other embodiments the coating is a thermal barrier coating.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
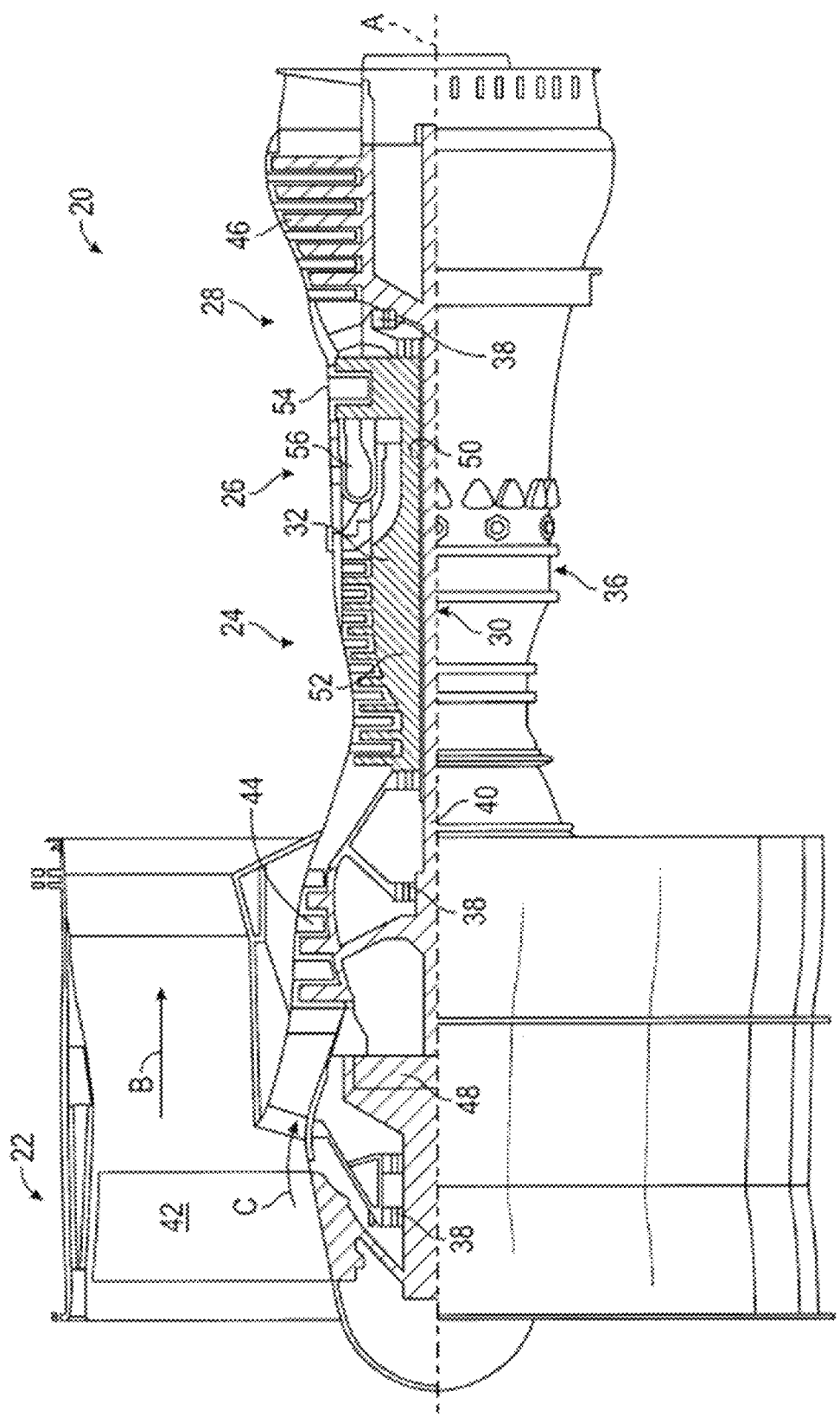
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

Figure 2:
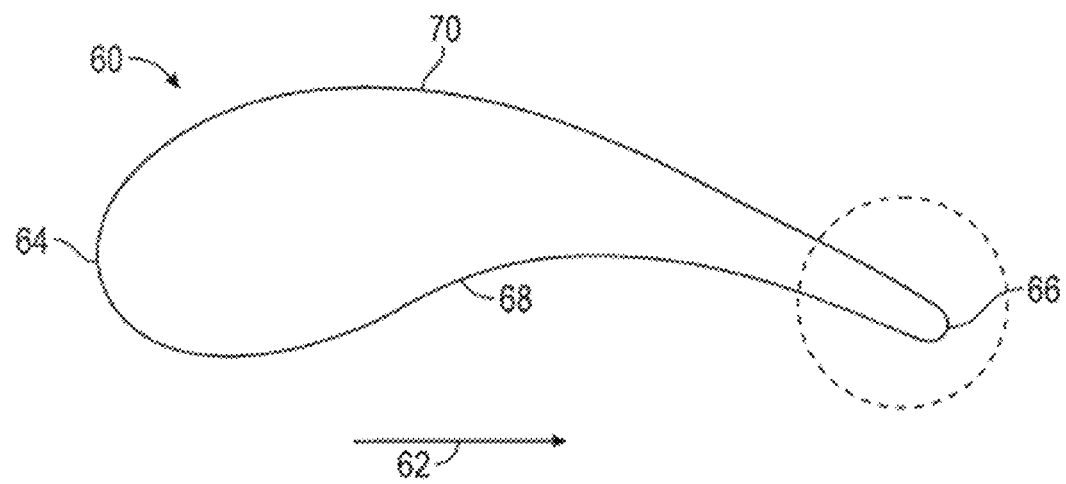
FIG. 2 is a cross-sectional view of an embodiment of an airfoil including a substrate having a coating with a coating taper zone.

Various sections of the gas turbine engine 20, such as the high pressure compressor 52, the high pressure turbine 54 and the low pressure turbine 46 include a plurality of airfoils 60, for example stationary vanes and rotating blades to direct airflow along the flowpath of the gas turbine engine 20 between respective rotors of the high pressure compressor 52, the high pressure turbine 54 and the low pressure turbine 46. An exemplary airfoil 60 is illustrated in the cross-sectional view of FIG. 2. The relative to the general airflow direction 62 past the airfoil 60, the airfoil 60 has a leading edge 64 and a trailing edge 66. A pressure side 68 and a suction side 70 connect the leading edge 64 to the trailing edge 66.

Figure 3:
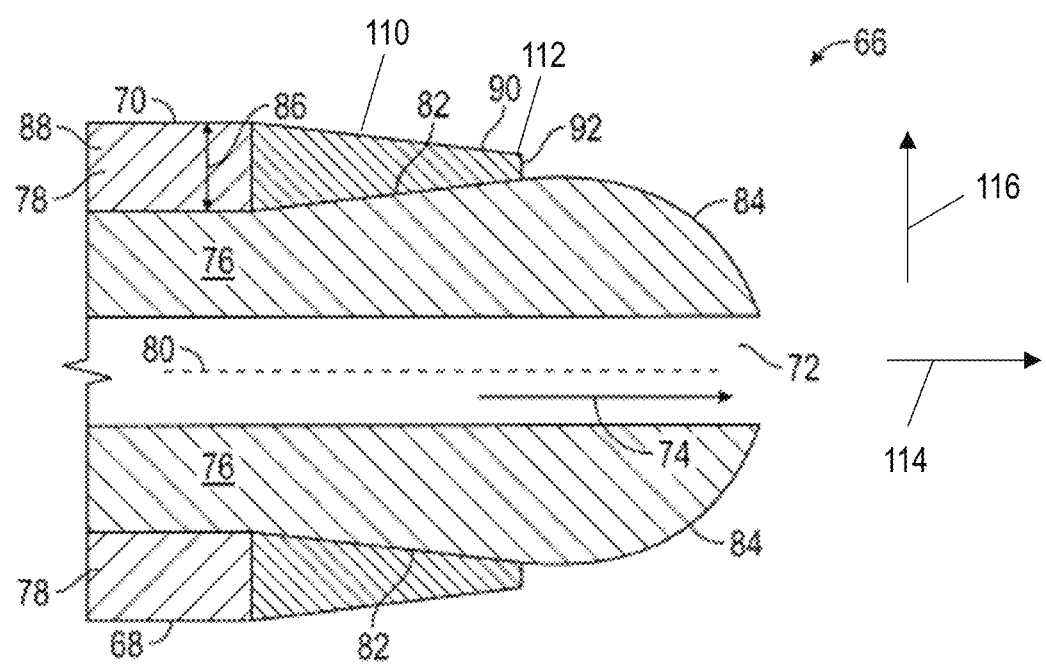
FIG. 3 is a cross-sectional view of an embodiment of a trailing edge portion of an airfoil.

Referring to FIG. 3, the trailing edge 66 of an exemplary airfoil 60 is illustrated. In some embodiments, the trailing edge 66 includes a core center discharge 72 to exhaust a cooling airflow 74 from an interior of the airfoil 60 to outside of the airfoil 60. The airfoil 60 includes a substrate portion 76 and a coating portion 78 applied to the substrate portion 76. In some embodiments, the substrate portion 76 is formed from a high-temperature metallic material or a ceramic matrix composite material, for example, and may be formed by casting or other manufacturing processes. In some embodiments, the coating portion 78 is a thermal or environmental barrier coating.

The substrate portion 76 thickens or flares outwardly along a camber line 80 of the airfoil 60 at a flare portion 82 as the substrate portion 76 approaches the trailing edge 66 before thinning via a trailing edge radius 84 to the trailing edge 66. The coating portion 78 includes a first coating thickness 86 along a body portion 88 of the airfoil 60. The coating portion 78 has a coating outer surface 110 that tapers along a coating taper portion 90 extending from the body portion 88 to a coating trailing surface 92, which is forward of the trailing edge radius 84 of the substrate portion 76, with the trailing edge radius 84 left uncoated. The coating outer surface 110 and the coating trailing surface 92 define a coating trailing edge 112 at an intersection thereof. This coating trailing edge 112 is spaced apart from the substrate portion 76 in a blade thickness direction 116 and spaced apart from a maximum thickness of the flared portion in a camberwise direction 114.

Figure 4:
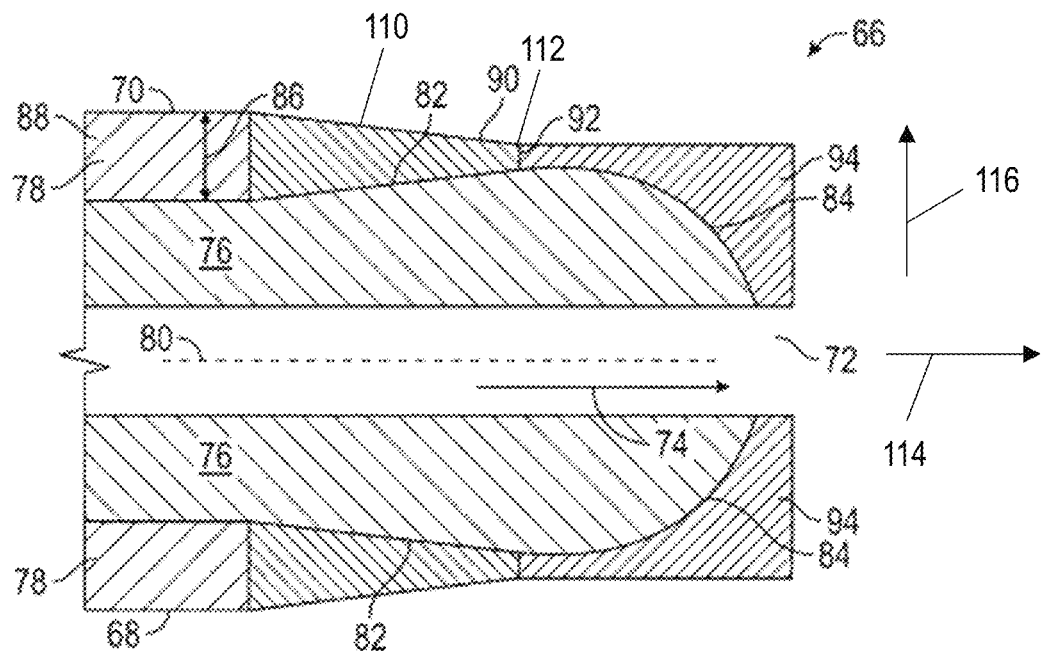
FIG. 4 is another cross-sectional view of a trailing edge of an airfoil including a substrate having a coating with a coating taper zone, and further including additional casting stock.

Referring now to FIG. 4, the substrate portion 76 is formed with an additional casting stock layer 94 extending from the flare portion 82 to the trailing edge 66. In some embodiments, the casting stock layer 94 abuts the coating taper portion 90. The casting stock layer 94 is configured as additional substrate portion 76 material thickness which allows for machining of the trailing edge 66 to a selected shape of a desired thickness, for example, a full, single constant radius extending from the pressure side 68 to the suction side 70.

Figure 5:
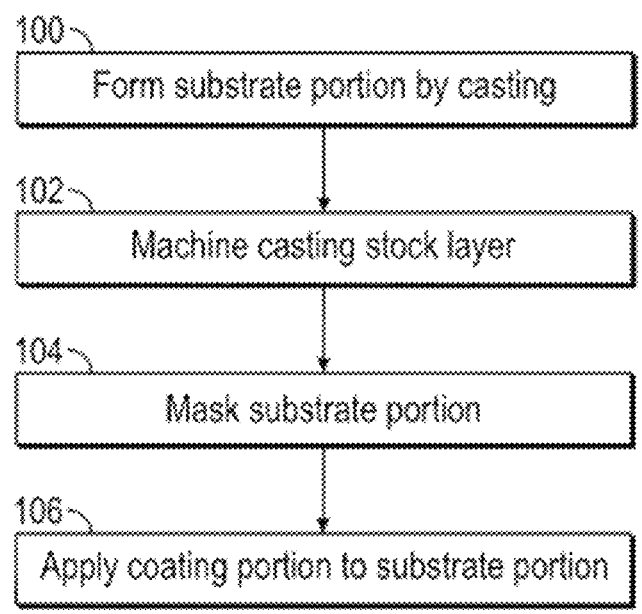
FIG. 5 is a schematic diagram of a method of forming an airfoil.

Shown in FIG. 5 is a schematic illustration of a method of forming a airfoil 60. In block 100, the substrate portion 76 is formed by a casting process, including the casting stock layer 94. In block 102, the casting stock layer 94 is machined, to form the trailing edge 66 into a selected shape, for example, a full constant radius. In block 104, the substrate portion 76 may be masked prior to application of the coating portion 78. In block 106, the coating portion 78 is applied to the substrate portion 76, including along the body portion 88 and the coating taper portion 90 to the coating trailing surface edge 92.

The airfoil 60 according to the present disclosure provides flexibility in the manufacture of the trailing edge 66, allowing for machining of the trailing edge 66 to a selected shape to, for example, improve operational efficiency of the airfoil 60. Thus, the trailing edge 66 may be formed to the aerodynamic design shape. Further, utilizing the flare portion 82 reduces a step or mismatch between the coating trailing surface 92 and the substrate portion 76 between the coating trailing surface 92 and the trailing edge 66.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, comprising:
    a substrate portion extending from an airfoil leading edge to an airfoil trailing edge portion, the airfoil trailing edge portion including:
        a flared portion wherein a substrate portion thickness increases along a camber line of the airfoil with increasing distance from the airfoil leading edge; and
        a trailing edge located downstream of the flared portion, extending from a pressure side of the airfoil to a suction side of the airfoil; and
    a coating portion comprising a coating applied over at least a portion of the substrate portion, the coating portion having a coating trailing surface and a coating outer surface, the coating trailing surface and the coating outer surface defining a coating trailing edge at an intersection thereof spaced from the substrate portion in a thickness direction and spaced upstream from a maximum thickness location of the flared portion in a camberwise direction.

2. The airfoil of claim 1, wherein the coating portion includes:
    a body portion having a substantially constant coating thickness; and
    a taper portion disposed between the body portion and the coating trailing surface.

3. The airfoil of claim 2, wherein the taper portion extends to the coating trailing surface.

4. The airfoil of claim 1, wherein the substrate portion is formed by casting.

5. The airfoil of claim 1, wherein the trailing edge is formed by one or more machining processes.

6. The airfoil of claim 1, wherein the coating is a thermal barrier coating.

7. The airfoil of claim 1, further comprising a core center discharge at the trailing edge to exhaust a cooling airflow from an interior of the airfoil.

8. A method of forming an airfoil for a gas turbine engine, comprising:
    forming an airfoil substrate portion, the airfoil substrate portion including an airfoil leading edge and an excess material portion at a trailing edge region of the airfoil substrate portion; and
    machining the excess material portion to define:
        a flared portion wherein a thickness of the substrate portion increases along a camber line of the airfoil with increasing distance from the airfoil leading edge; and
        a trailing edge located downstream of the flared portion, the trailing edge defined as a selected shape extending from a pressure side of the airfoil to a suction side of the airfoil;
    applying a coating portion comprising a coating over at least a portion of the substrate portion, the coating portion having a coating trailing surface and a coating outer surface, the coating trailing surface and the coating outer surface defining a coating trailing edge at an intersection thereof spaced from the substrate portion in a thickness direction and spaced upstream from a maximum thickness location of the flared portion in a camberwise direction.

9. The method of claim 8, wherein the machining the excess material portion to define the selected shape comprises forming a full constant radius extending from the pressure side to the suction side.

10. The method of claim 8, wherein applying the coating portion comprises:
    applying a body portion having a substantially constant coating thickness; and
    applying a taper portion disposed between the body portion and the coating trailing surface.

11. The method of claim 10, wherein the taper portion extends to the coating trailing surface.

12. The method of claim 8, wherein the coating is a thermal barrier coating.

* * * * *